United States Patent Office

3,406,078
Patented Oct. 15, 1968

3,406,078
PROCESS FOR COATING LOW MOISTURE FRUITS
L. G. Williams, Martinez, Calif., assignor to Vacu-Dry Company, Emeryville, Calif., a corporation of California
No Drawing. Filed Aug. 17, 1964, Ser. No. 390,193
7 Claims. (Cl. 99—168)

ABSTRACT OF THE DISCLOSURE

Low moisture fruit segments are precoated with a sugar mixture bonding material, exposed to a humid atmosphere, vacuum dried to a low moisture content, and then postcoated with a slightly moistened granular coating.

---

This invention relates generally to comestible bonded coatings and more particularly to methods and edible materials for adhesively bonding low moisture coating mixtures to low moisture fruits.

One object of this invention is to provide a method for bonding a low moisture granular coating material to extremely low moisture fruit segments by adhering the material with an edible adhesive applied to the segments.

Another object of this invention is to provide methods and materials for bonding coating materials to low moisture fruit segments to reduce the moisture acceptance of the coated segments.

Another object of this invention is to provide methods and materials for making sugar coated dehydrated fruit segments wherein sticking of the fruit segments to each other or to processing equipment is eliminated during the coating and drying procedures.

A further object of this invention is to provide methods and materials for sugar coating fruit segments which enhance and contribute to establishment of a puffed cell structure within the coated segments.

Other objects and advantages of this invention will become apparent to those familiar with this art upon consideration of the following description of specific embodiments of the methods and bonding materials.

Heretofore it has been difficult to coat dehydrated fruit segments with granular sugar mixtures of low moisture content. If the coating is applied to the fruit segments prior to dehydration moisture in the segments and heat developed during the dehydration process form the coating into a glaze over the segment surfaces which cements the individual segments to each other and to the processing equipment. The glaze also retards dehydration. On the other hand, if the fruit segments are first dried to low moisture, granular sugar mixtures are very difficult to adhere to the segment surfaces and only a small portion of that applied will in fact do so. If a very moist coating material is applied, somewhat more coating material adheres, but moisture in the coating mixture is absorbed by the dried hydroscopic fruit. This, of course, results in a coated product which no longer has a low moisture content and is undesirable in many instances.

In the described method fruit segments at, for example, the "evaporated" moisture level of 15 to 40% moisture receive a precoat of a mixture containing a high proportion of edible bonding material. The precoat adheres firmly to the fruit segment surfaces and bonds to them a postcoat of a dry coating mixture. The precoat foams under vacuum drying conditions to encase each segment in a friable foam surface coating. Spray dried corn syrup solids are a useful bonding material, particularly for granular postcoating materials such as sugar. Dehydrated corn syrup solids are a finely divided spray dried powder consisting mainly of dextrins, dextrose and maltose. Corn syrup solids normally are low in dextrose content. The corn syrup solids, when precoated on and partially heat impregnated into the fruit segment surfaces, not only bond postcoating mixtures to extremely dry fruit segments but also provide a puffed friable foam barrier between fruit segments to prevent their sticking together and to drying equipment in which the segments are processed. In addition, a corn syrup solids precoat is believed to enhance the puffed nature of the vacuum dried fruit segments. Pure dextrose, liquid corn syrup and other foam-forming materials also are useful bonding materials for granular coatings, however, dextrose does not prevent sticking of the apple segments and does not seem to enhance the puffed nature of vacuum dried segments as does a corn syrup solids precoat having high dextrin content.

The corn syrup solids in highly divided powdered form are normally applied dry to the slightly tacky surfaces of fruit segments having a moisture content at about the "evaporated" level. In precoating apple segments, for example, the corn syrup solids are applied to apple segments having a moisture level in the range of 15 to 40% by weight by tumbling the segments and the corn syrup solids together. The advantages of the bonding properties of corn syrup solids can also be obtained by wetting apple segments of lower moisture content and then tumbling the moistened segments with dry corn syrup solids. Fruit segments having moisture greater than that of the "evaporated level," such as fresh or canned fruits, also can be used.

The precoated fruit segments are then exposed to an atmosphere having high humidity. The corn syrup solids are very hydroscopic and absorb moisture from the atmosphere to form an extremely concentrated corn syrup solids solution on the surfaces of the fruit segments. The solvated precoating can be obtained by exposing the segments to a heated humid air stream or by holding them for several hours at normal atmospheric conditions.

The segments then may be heated to a temperature sufficient to fuse the precoat of corn syrup solids solution thoroughly over the segment and into the pores of the segment surfaces. This heating may be done simultaneously with exposure of the segments to a humid atmosphere. For apples, for example, the segments may be placed in dryer through which one passes warm humid air at about 150° F. or pure steam at temperatures above 212° F. During this heating, hydrolytic cleavage of some of the malto-dextrins may occur to yield an increase in the dextrose content of the precoat material.

The coated fruit segments are then dehydrated under vacuum conditions to a low moisture content. The vacuum dehydration continues until the precoated apple segments have a reduced moisture content in the range of ½ to 3% by weight. During vacuum drying the corn syrup solids solution changes physically to form a puffed friable foam on and between the fruit segments as well as between the segments and the processing equipment supporting them. The puffed friable foam completely encapsulates each segment and permits easy removal of the dried fruit from the drying equipment without any appreciable breakage of the brittle fruit segments. The foam also prevents sticking among the several segments. The puffing foam also enhances the puffed texture, which is normally obtained by vacuum drying, within the fruit segments themselves. This is highly desirable for some purposes.

The dried segments are cooled and then are removed from the vacuum drying equipment. Separation of the segments from one another is easily accomplished by gentle self abrasive tumbling or other vibrational action in, for example, a mechanical dry solids blender. During tumbling the excess portions of the corn syrup solids foam is broken off and reduced to small particle size.

The corn syrup solids fines then are screened from the fruit segments. The fines may be recycled to the initial coating stages of the process. At these low moistures the foamed precoat on the segment surfaces is dry and non-tacky.

Next the granular coating is applied to the low moisture precoated fruit segments by tumbling them with postcoating material, for example, a granular slightly moistened sucrose mixture containing flavor ingredients. The mixture may also contain vegetable oil for flavor enhancement but the oil is not essential to achieve postcoat bonding. The granular sucrose easily adheres to the surfaces of the low moisture precoated fruit segments. The dry coating materials are moistened prior to tumbling with the fruit segments to about 1 to 6% moisture so that the composite moisture content of the final coated fruit product has a total moisture content within the range desired for the particular product use.

The ratio of the weight of adhered coating to the total final product weight is directly dependent upon the amount of precoat applied. This ratio can be as high as 0.60. It is thought that the small amount of moisture in the dry postcoat ingredients migrates to the corn syrup solids foam which is firmly bonded on the surfaces of the fruit segments. This moisture movement perhaps produces a higher moisture content in the corn syrup solids coating without diffusion into the fruit solids and, because of the moisture transfer, the sucrose crystals in the coating material attach to the surfaces of the precoated segments at surface sites of water solvated corn syrup solids foam.

In one variation of the described procedure sucrose, dextrose, dextrins or various flavor ingredients can be added directly to the corn syrup solids precoat. No postcoating then is required. The precoating composition should contain a minimum of 50% by weight of dried corn syrup solids of high dextrin content to assure the adhesive bonding and foaming properties. The sugar-corn syrup solids precoat forms in a manner similar to that described above. The foam prevents sticking among the various segments and to the processing equipment. Following vacuum dehydration in this variation the coated segments need only to be tumbled slightly to remove excess portions of the sugar-corn syrup solids foam. The segments after separation from coating material fines then are ready for packaging and subsequent use. No postcoating procedure is necessary.

By way of example, the foregoing techniques are useful for adhering a granular sugar coating to dehydrated apple segments to produce a sweetened apple chip snack.

Example 1

Six hundred seventy-five grams of sliced evaporated apple rings ⅛ inch in thickness and having a moisture content of 29.1 percent by weight were coated with 300 grams of spray dried corn syrup solids by tumbling the segments and solids together in a dry solids blender for about 10 minutes. The coated apple segments then were removed from the blender and immediately charged onto metal trays and spread uniformly over the tray surfaces. The apple segments next were heated in steam until the corn syrup solids coating melted and thoroughly covered the segment surfaces. The trays carrying the segments then were introduced to a vacuum dehydrator and the moisture content of the segments reduced under vacuum to 1.1 percent by weight. The product temperature during dehydration did not exceed 180° F. The segments then were cooled to less than 100° F. prior to discharge from the vacuum dehydrator.

The corn syrup solids coating during vacuum drying foamed and formed a thick foam coating over each of the segments. The foam coating was extremely friable and enabled the apple segments to be removed quite easily from the drying trays. The foam coated segments then were mechanically vibrated by tumbling them in the dry solids blender for about 10 minutes. The gentle tumbling movement mildly abraded the surfaces, separating the segments and removing excess foam from the outer surfaces of the segments. The contents of the blender then were screened to separate the coated segments from the corn syrup solids fines formed during the tumbling operation. At this point the apple segments contained a residual 19.28 percent precoat of corn syrup solids by weight.

Then 562 grams of precoated apple segments (containing 450 grams of apple solids) were postcoated by tumbling with 288 grams of a moisturized granular sucrose mixture containing 1 percent flavor ingredients, 3 percent moisture and 10.3 percent of a refined vegetable oil by weight. The precoated apple segments were tumbled for 5 minutes in the dry solids blender with the postcoat mixture until virtually all the postcoat mixture was bonded to the fruit by the edible precoated adhesive.

The final coated product recovery was 850 grams of thoroughly and firmly coated apple segments having less than 2.0 percent moisture content by weight. The retained precoat and postcoat applications on the apple segments were about 47 percent of the total product weight.

Example 2

Three hundred and fifty grams of sliced evaporated apple rings ⅛ inch in thickness and having a moisture content of 22 percent by weight were coated by tumbling with 300 grams of a precoat sugar-corn syrup solids mixture in a dry solids blender for about 10 minutes. The precoat mixture comprised less than 1 percent of flavor ingredients and spray dried corn syrup solids and granular sucrose in a weight ratio of 2 to 1, respectively.

Following precoating the coated rings were immediately spread uniformly over the surface of metal trays and exposed to low pressure stream at temperatures more than sufficient to melt the sugar mixture coating in place on the surfaces of the apple segments. The coated segments then were vacuum dried to a moisture content of less than 2 percent moisture by weight. The product temperature was held to less than 180° F. during vacuum drying. As the segments dried the sugar-corn syrup solids coating puffed and formed a friable foam layer between each of the apple pieces as well as between the apple pieces and the surfaces of the metal trays. An enhanced puffing was also visible in the texture of the final apple segments. After the apple segments cooled to less than 100° F. the vacuum was broken. The low moisture segments were easily removed from the metal tray surfaces with little or no breakage of the individual pieces.

The apple segments then were separated from one another by a mild tumbling in the dry solids blender. The mildly abrasive action of the apple segments against one another removed the excess sugar foam as granular fines. The segments next were screened from the fines. The resultant product had a firmly bonded sugar coating amounting to about 36 percent of the total product weight.

The foregoing embodiments and examples of this invention have been given for illustrative purposes only and no unnecessary limitation should be understood therefrom for various modifications will be apparent to those familiar with this art. The invention is defined in the appended claims.

I claim:

1. A method for bonding a dry comestible coating to a low moisture fruit including the steps of precoating segments of the fruit with a sugar mixture bonding material; exposing the precoated segments to a humid atmosphere to form a concentrated water solution of said bonding material on the surfaces of the said segments; vacuum drying the precoated segments to a low moisture content; and then postcoating the low moisture segments with a slightly moistened granular coating.

2. A method according to claim 1 wherein said sugar mixtures bonding material when solvated and then dried under vacuum puffs into an expanded friable foam.

3. A method according to claim 1 wherein said sugar mixture bonding material is spray dried corn syrup solids.

4. A method for bonding a dry comestible coating to a low moisture fruit comprising the steps of precoating segments of the fruit having a moisture content of 15–40 percent by weight with a dry sugar mixture bonding material; exposing the precoated segments to a humid atmosphere to form a concentrated water solution of said bonding material on the surfaces of the said segments; applying heat to said segments to partially infuse the solution of bonding material into the surfaces of said segments; vacuum drying the precoated segments to a low moisture content of less than 3 percent by weight and simultaneously forming the solvated bonding material into a puffed friable foam encapsulating each segment; abrading the low moisture segments to remove excess bonding material foam; and then postcoating the low moisture segments with a dry granular coating mixture which is slightly moistened to 1 to 6 percent water by weight.

5. A method according to claim 4 wherein said sugar mixture bonding material is spray dried corn syrup solids.

6. A method for bonding a dry granular sugar coating to a low moisture fruit including the steps of precoating segments of the fruit having a moisture content of 15–40 percent by weight with a dry mixture including a sugar mixture bonding material and granular sugar; exposing the precoated segments to a humid atmosphere to form a concentrated water solution of said bonding material on the surfaces of said segments; and vacuum drying the coated segments to a low moisture content and simultaneously forming the solvated bonding material into a puffed friable foam encapsulating the granular sugar and adhering it to said segments.

7. A method according to claim 6 wherein said sugar mixture bonding material is spray dried corn syrup solids.

References Cited
UNITED STATES PATENTS

| | | | |
|---|---|---|---|
| 2,084,956 | 6/1937 | Hessel | 99—204 X |
| 2,110,184 | 3/1938 | Webb | 99—204 |
| 2,976,159 | 3/1961 | Swisher | 99—204 |
| 3,094,947 | 6/1963 | Green et al. | 99—168 X |

A. LOUIS MONACELL, *Primary Examiner.*

S. DAVIS, *Assistant Examiner.*